(12) United States Patent
Borumand et al.

(10) Patent No.: US 10,532,801 B2
(45) Date of Patent: Jan. 14, 2020

(54) CONTINUOUS INSULATION BLANKET CAP STRIP ASSEMBLIES AND METHODS OF USING SAME

(71) Applicant: THE BOEING COMPANY, Chicago, IL (US)

(72) Inventors: Khash Borumand, Woodinville, WA (US); Arif Zaman, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 367 days.

(21) Appl. No.: 15/407,457

(22) Filed: Jan. 17, 2017

(65) Prior Publication Data
US 2018/0201357 A1  Jul. 19, 2018

(51) Int. Cl.
*B64C 1/06* (2006.01)
*B64C 1/40* (2006.01)

(52) U.S. Cl.
CPC .............. *B64C 1/067* (2013.01); *B64C 1/40* (2013.01)

(58) Field of Classification Search
CPC ........... B64C 1/40; B64C 1/403; B64C 1/406; B60R 13/08; B60R 13/0815; B60R 2013/0807; Y02T 50/46
See application file for complete search history.

(56) References Cited

U.S. PATENT DOCUMENTS

| | | | |
|---|---|---|---|
| 2,912,724 A | 11/1959 | Wilkes | |
| 8,616,498 B2 * | 12/2013 | Hossain | B32B 27/12 244/121 |
| 8,662,448 B2 * | 3/2014 | Weston | B64C 1/40 244/119 |
| 8,882,041 B2 * | 11/2014 | Mueller | B64C 1/40 244/121 |
| 9,193,435 B2 * | 11/2015 | Holm | B64C 1/40 |
| 9,211,945 B2 * | 12/2015 | Redecker | B64C 1/067 |
| 9,988,137 B2 * | 6/2018 | Borumand | A62C 3/08 |
| 2006/0284014 A1 * | 12/2006 | Muller | A62C 2/06 244/119 |

(Continued)

FOREIGN PATENT DOCUMENTS

| | | | |
|---|---|---|---|
| CA | 2375747 A1 * | 12/2000 | ............... B64C 1/40 |
| DE | 102004001049 A1 | 7/2005 | |

(Continued)

OTHER PUBLICATIONS

Extended European Search Report for Application No. EP17194338 dated Mar. 23, 2018.

*Primary Examiner* — Benjamin P Lee
(74) *Attorney, Agent, or Firm* — Coats & Bennett, PLLC

(57) ABSTRACT

A blanket assembly for use in at least one bay and with at least one frame member of an aircraft, the assembly including an insulation blanket. The insulation blanket includes a bay section sized and shaped to fit within the bay and of sufficient thickness to provide insulation to the bay, a return section disposed on a first side of the bay section; and a cap section disposed on a second side of the bay section, opposite the first side. The cap section is sized and shaped to at least partially cover the frame member when the cap section is wrapped around the frame member, the cap section being of sufficient thickness to provide insulation to the frame member. The bay section, the return section, and the cap section are of unitary construction.

20 Claims, 8 Drawing Sheets

(56) References Cited

U.S. PATENT DOCUMENTS

| | | | |
|---|---|---|---|
| 2007/0272320 A1 | 11/2007 | Roberson | |
| 2009/0090812 A1* | 4/2009 | Boock | B64C 1/40 244/1 N |
| 2009/0302154 A1* | 12/2009 | Groning | B64C 1/40 244/1 N |
| 2010/0243807 A1* | 9/2010 | Hossain | B32B 27/12 244/121 |
| 2011/0233336 A1 | 9/2011 | Dervault et al. | |
| 2012/0234979 A1* | 9/2012 | Smith | B64C 1/40 244/158.1 |
| 2013/0020434 A1 | 1/2013 | Muller et al. | |
| 2013/0240668 A1* | 9/2013 | Holm | B64C 1/067 244/1 N |
| 2014/0189986 A1* | 7/2014 | Carrillo | F16B 2/24 24/564 |
| 2015/0225070 A1* | 8/2015 | Wilander | B64C 1/403 244/131 |
| 2016/0268965 A1* | 9/2016 | Stearns | H02S 40/32 |
| 2017/0197698 A1* | 7/2017 | Irwin | B64C 1/067 |
| 2017/0283031 A1* | 10/2017 | Borumand | A62C 3/08 |

FOREIGN PATENT DOCUMENTS

| | | |
|---|---|---|
| EP | 2236412 A2 | 10/2010 |
| EP | 3225538 A1 | 4/2017 |
| WO | 0075012 A1 | 12/2000 |
| WO | 0153605 A1 | 7/2001 |
| WO | 2012170198 A1 | 12/2012 |

* cited by examiner

CONTINUOUS INSULATION BLANKET CAP STRIP ASSEMBLIES AND METHODS OF USING SAME

FIELD

The present disclosure generally relates to the moisture control field. More particularly, the present disclosure relates to the field of moisture control in a vehicle.

BACKGROUND

In an aircraft, the outer skin is spaced from the walls and ceiling of a passenger cabin (or other compartment), and the gap is at least partially filled with an insulation layer or blanket. The insulation layer is typically formed from a waterproof material and often in the form of a plurality of blankets. Conventional insulation blankets come in three separate but subsequently attached parts, a bay blanket that fits between two frame members (which form a "bay" between them), a cap strip that covers the frame members, and a return blanket. The cap strips are held to the frame members by a retaining or spring clip. Today, gaps between bay blankets and cap strips permit cabin air to reach the aircraft skin and the frame members, which become cold during flight. Liquid from moist air can condense against the cold skin and/or the cold frame members, particularly at the top of the fuselage, and freeze during cruise. During descent, this frozen liquid can thaw and drip back down towards the cabin, but because of the gaps between the bay blankets and cap strips, the liquid can sometimes seep through the gaps and into the passenger cabin, which is an undesirable result.

In addition, condensed moisture sometimes can find its way into the gaps between the bay blankets and cap strips during flight, and within folds and/or wrinkles in the blankets, for example where they are held to the frame members by the retaining clips. This condensed moisture in the gaps and/or folds is often situated near a cold frame member or cold clip (which are conventionally thermally conductive and are cooled by being in close proximity to the frame members) and also is prone to freezing during cruise and then thawing during descent, leading to liquid moisture falling into the passenger cabin.

BRIEF SUMMARY

There is provided in accordance with an aspect, a blanket assembly for use in at least one bay and with at least one frame member of an aircraft, the assembly comprising: an insulation blanket, the insulation blanket comprising, a bay section sized and shaped to fit within the bay and of sufficient thickness to provide insulation to the bay; a return section disposed on a first side of the bay section; and a cap section disposed on a second side of the bay section, opposite the first side, the cap section sized and shaped to at least partially cover the frame member when the cap section is wrapped around the frame member, the cap section being of sufficient thickness to provide insulation to the frame member, wherein the bay section, the return section, and the cap section are of unitary construction.

In an aspect, the bay section, the return section, and the cap section vary in thickness as a continuous whole, without the use of seams or heat seals or tape joints.

In an aspect, each of the bay section, return section and cap section are provided with at least one row of reversible fasteners. In an aspect, the at least one row of reversible fasteners is affixed near the first side of the bay section on an inboard side of the bay section. In an aspect, the at least one row of reversible fasteners is affixed on an inboard side of the return section. In an aspect, at least two rows of reversible fasteners are affixed on an outboard side of the cap section. In an aspect, the cap section of the continuous cap strip insulation blanket is sized to extend around the frame member and to a bay section of an adjacent second cap strip insulation blanket positioned in an adjacent second bay of the aircraft. In an aspect, the at least one row of reversible fasteners on the bay section is configured as a counterpart to a second cap fastener row, and the at least one row of reversible fasteners on the return section is configured as a counterpart to a first cap fastener row. In an aspect, the at least one row of reversible fasteners is comprised of hook and loop fasteners. In an aspect, the at least one row of reversible fasteners is evenly spaced along a length of the insulation blanket.

In an aspect, the at least one row of reversible fasteners is continuous along a length of the continuous cap strip insulation blanket. In an aspect, the return section comprises only a coverfilm material.

In an aspect, the blanket assembly further comprises a retaining clip placed around the cap section, the retaining clip holding the cap section to the frame member, the retaining clip being formed from a resilient material. In an aspect, the retaining clip is constructed of a low-thermally conductive material. In an aspect, a cap section-facing portion of the retaining clip is textured to enhance the grip of the retaining clip on the insulation blanket.

In an aspect, the insulation blanket is moisture impermeable.

There is further provided in an aspect, an insulation layer of an aircraft, the insulation layer comprising: a plurality of insulation blanket assemblies, wherein the insulation blanket assemblies are reversibly fastened together.

There is further provided in an aspect, a method of using at least one insulation blanket assembly with at least one bay and at least one frame member of an aircraft, the method comprising: placing a first blanket within a first bay; covering the at least one frame member with a cap section of the first insulation blanket; placing a second insulation blanket in a second bay adjacent to the first bay and the at least one frame member; and fastening the cap section of the first insulation blanket to at least one of a return section and a bay section of the second insulation blanket.

In an aspect, the method further comprises placing at least one retaining clip around the cap section of the first insulation blanket to hold the cap section to the at least one frame member. In an aspect, the method further comprises repeating placing an insulation blanket, covering the frame member with the cap section, placing an additional insulation blanket, fastening the cap section and placing the retaining clip around the cap section, for as many additional insulation blanket assemblies as desired to form an insulation layer of the aircraft.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of aspects of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some aspects of the disclosure are herein described, by way of example only, with reference to the accompanying drawings. With specific reference now to the drawings in detail, it is stressed that the particulars shown are by way of example, are not necessarily to scale, and are for purposes of illustrative discussion of aspects of the disclosure. In this regard, the description taken with the drawings makes apparent to those skilled in the art how aspects of the disclosure may be practiced.

DETAILED DESCRIPTION

Figure 1:
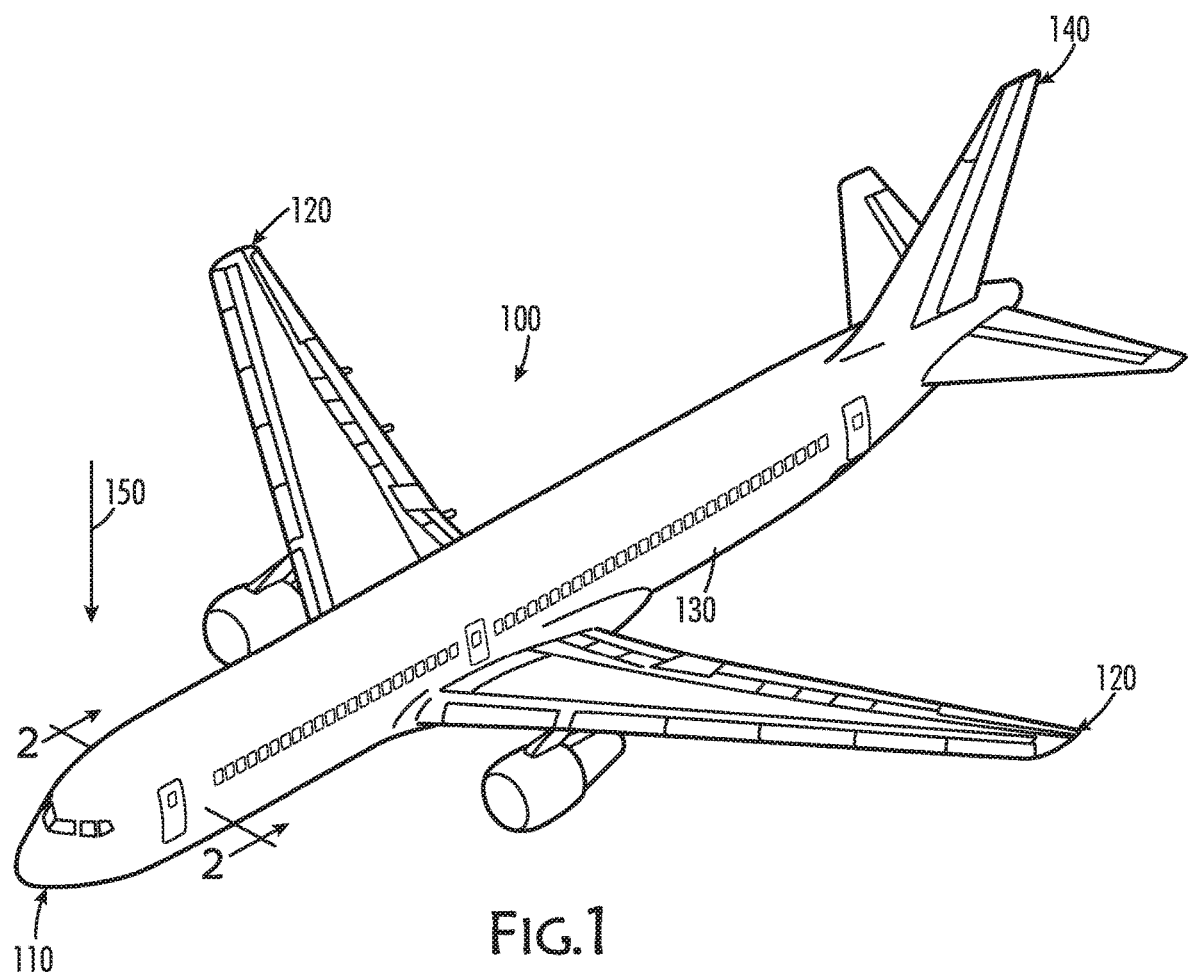
FIG. 1 is a schematic diagram of an aircraft.

The present disclosure generally relates to insulation blankets that can prevent gaps from forming between adjacent blankets. Accordingly, the assembly of insulation blankets directs more liquid to a bilge of an aircraft than an insulation system having conventional insulation blankets.

Before explaining at least one aspect of the disclosure in detail, it is to be understood that the disclosure is not necessarily limited in its application to the details of construction and the arrangement of the components and/or methods set forth in the following description and/or illustrated in the drawings. The disclosure is capable of other aspects or of being practiced or carried out in various ways.

Figure 2:
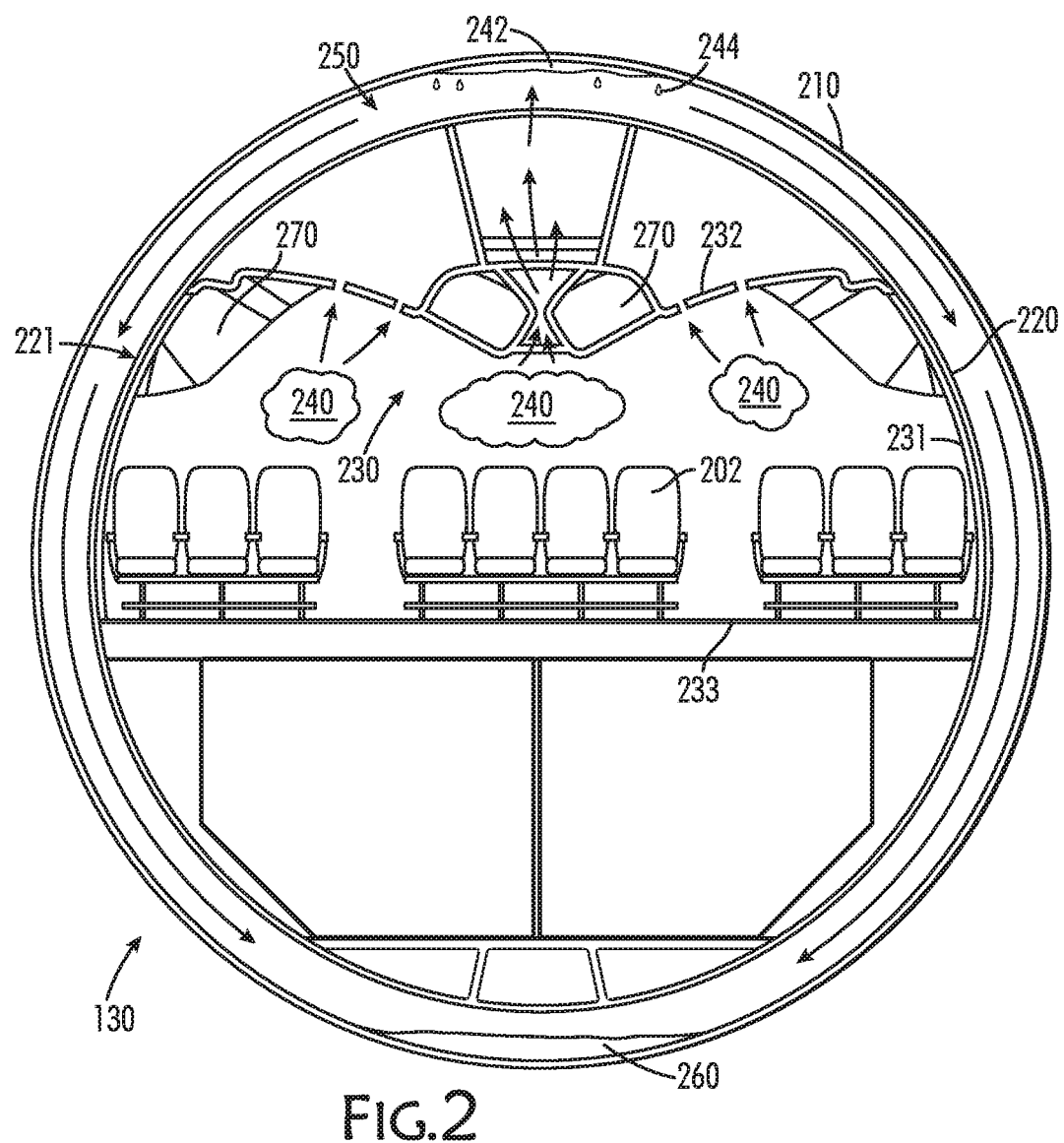
FIG. 2 is an exemplary cross-sectional, schematic view of the aircraft shown in FIG. 1 taken at line 2-2 in FIG. 1.

FIGS. 1 and 2 illustrate an exemplary aircraft and exemplary moisture flow within an exemplary aircraft, and FIGS. 3-6 and 7-8B show exemplary continuous cap strip insulation blanket assemblies, or components thereof, for preventing or at least minimizing moisture flow into an inner/passenger cabin portion of the aircraft, according to some aspects of the disclosure. FIG. 1 shows an aircraft 100 that includes a nose 110, wings 120, a fuselage 130, and a tail 140. FIG. 1 also illustrates a downward arrow 150 indicating the expected direction in which the force of gravity will pull objects, such as liquid water, onboard an aircraft 100 in a nominal operational profile. As used herein, "down", "downward" and "bottom" generally correspond to the direction of arrow 150, while "up", "upper" and "top" are generally in the opposite direction of the arrow 150.

FIG. 2 is a cross-sectional, schematic view of the aircraft 100 indicated by view arrows 2 in FIG. 1. FIG. 2 illustrates a portion of the aircraft fuselage 130, simplified for easier understanding of this Description. The fuselage 130 includes side walls 231, a ceiling 232, and a floor 233, which define the passenger cabin 230. Passengers in the aircraft 100 may congregate in seats 202 of the cabin 230 during flight. FIG. 2 illustrates that, inside of the fuselage 130 (e.g. in cabin 230), respiration and other sources of water cause moisture 240 to enter or form in the air in the cabin 230. For example, warm exhaled air includes moisture 240 and rises upward through luggage compartments/stowage bins 270. Some of this warm and moist air rises through the ceiling 232. Furthermore, some warm air continues to rise upward through an insulation layer 220 (or insulation blanket) into a space 250 between the insulation layer 220 and an outer wall 210 of the aircraft, also known as the aircraft skin, particularly in the crown/upper area of the fuselage.

Figure 4:
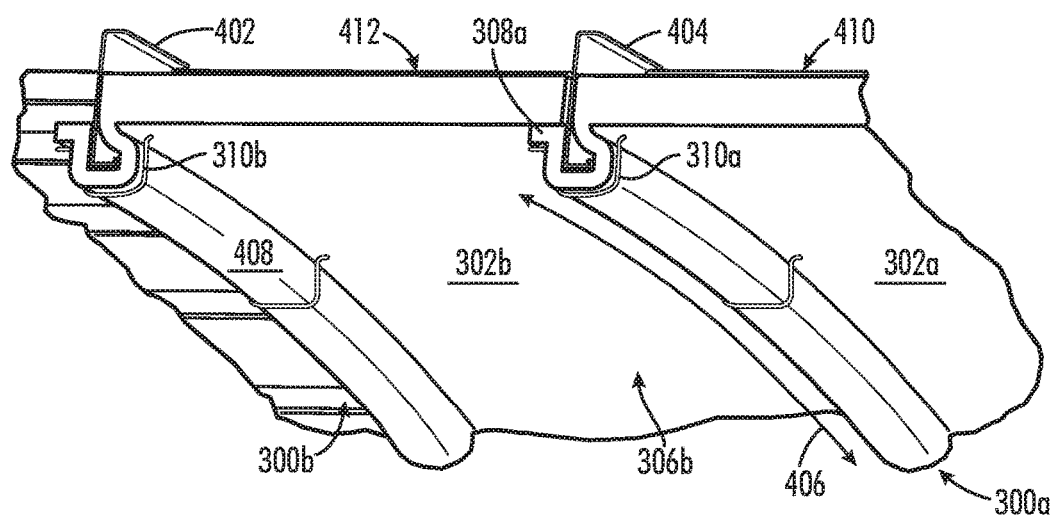
FIG. 4 is a perspective, cross-sectional view of a plurality of adjacent blanket assemblies of FIG. 3 attached together.
Figure 7:
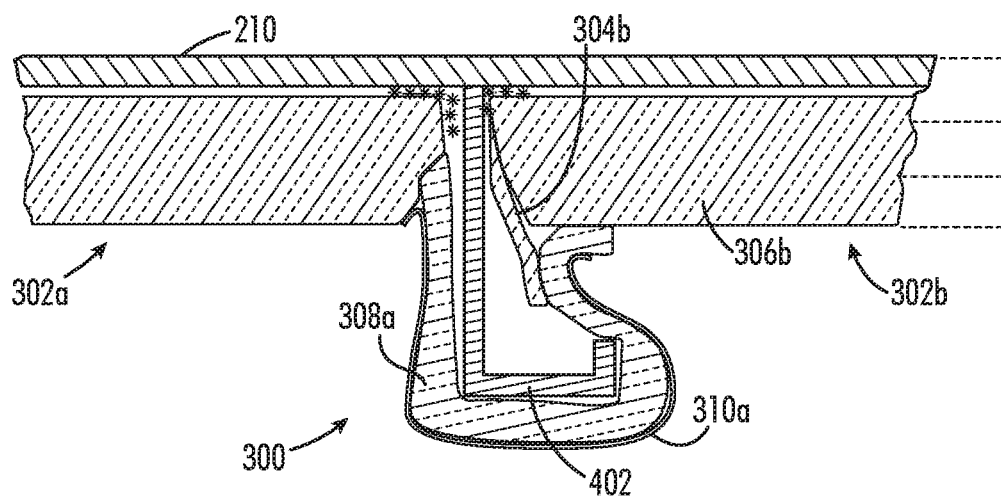
FIG. 7 is a cross-sectional view of an exemplary blanket assembly of FIG. 3.
Figure 8A:
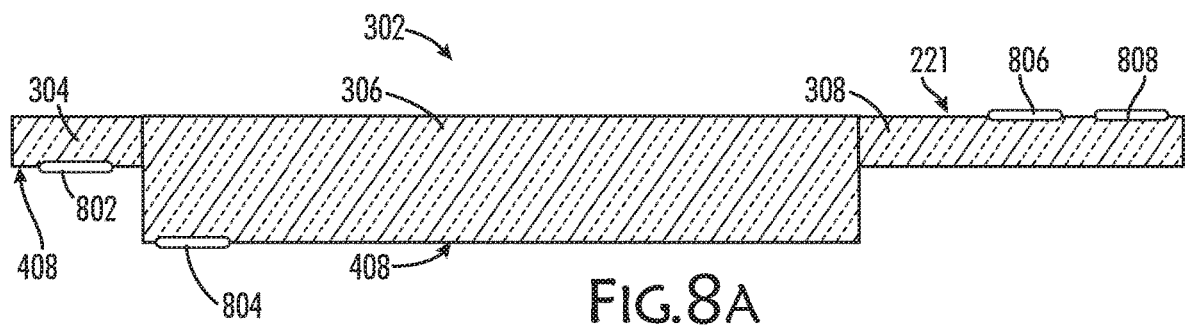
FIGS. 8A-8B show schematic side views of fastener configurations used with exemplary blankets of FIG. 3.
Figure 8B:
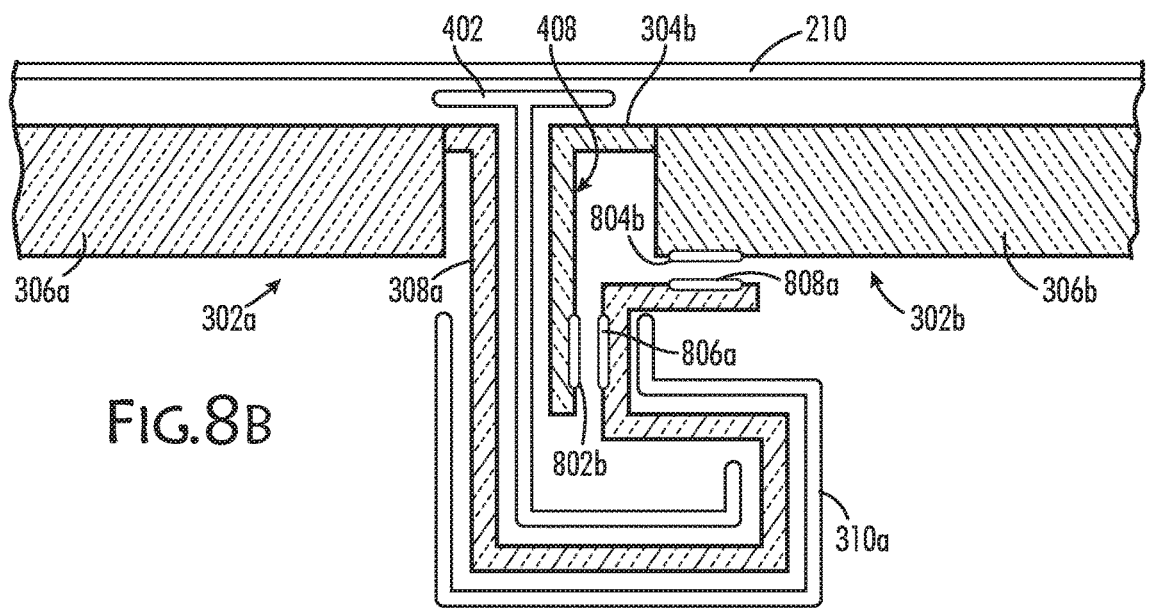

As the skin 210 and frame members (not shown in FIG. 2 for simplicity, but are shown in FIGS. 4, 7 and 8B) are cooled by the outside air at high altitude during flight, the temperature of the skin 210 and frame members eventually decreases to a temperature below the freezing temperature of water. This cooling causes moisture 240 (e.g., water) to condense out of the air in the space 250 and in the gaps/folds in the insulation layer 220 and freeze onto the inner surface of the skin 210 and/or frame members as ice 242. As the aircraft changes to a lower altitude and/or commences descent for landing and the temperature increases, the ice 242 can begin to melt causing moisture droplets 244 to travel through the space 250 towards the bilge 260 of the fuselage 130, drawn by gravity in the direction of arrow 150. Some moisture droplets 244 enter gaps in the insulation layer 220 or is already positioned in the gaps, drip on top of structures in the fuselage, such as the ceiling 232 and the stowage bins 270, and subsequently into the cabin 230. The size of the space 250 has been exaggerated somewhat in FIG. 2 in order to more clearly show the details of the structure.

Figure 3:
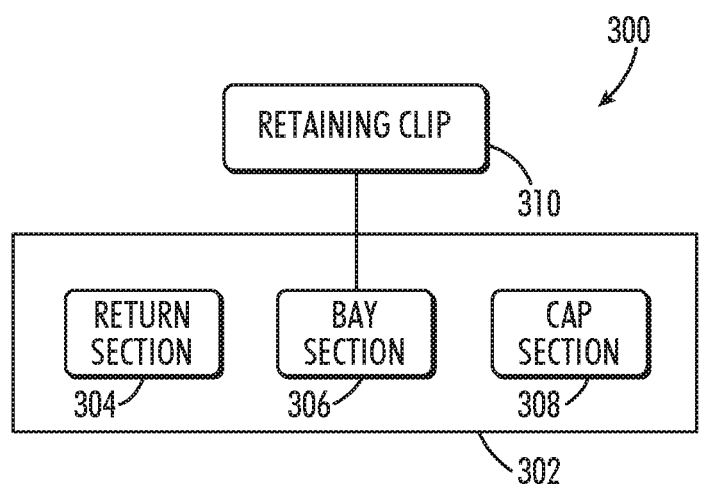
FIG. 3 is a block diagram of a blanket assembly that can be used with the aircraft shown in FIGS. 1 and 2.

FIG. 3 is a generalized block diagram of a blanket assembly 300 that can be used with an aircraft, for example the aircraft 100 shown in FIGS. 1 and 2, to help reduce moisture condensation and/or moisture ingress into the passenger cabin 230. The blanket assembly 300 comprises an insulation blanket 302 and at least one retaining clip 310. The blanket assembly 300 can be referred to as a "continuous cap strip insulation blanket assembly" because the assembly includes a continuous cap strip insulation blanket, as described in more detail below. One or more blanket assemblies 300 can be used together to form the insulation layer 220 (shown in FIG. 2).

Generally, the blanket assemblies 300 described herein are configured to prevent, or at least diminish, the possibility of liquid moisture dripping through and/or down internal aircraft structures like frames, stringers, insulation blankets, fittings, and/or brackets and into the cabin 230. For example, the blanket assembly 300 eliminates, or at least reduces, gaps between bay blankets and cap strips by combining a bay blanket portion and a cap strip portion into an insulation blanket 302 of unitary construction including a return section 304, a bay section 306, and a cap section 308. The cap section 308 functions similarly to what is conventionally known as a "cap strip"; however, the cap section 308 described herein differs from a conventional cap strip as will better understood in the following description. The insulation blanket 302 is unitarily constructed because the insulation blanket 302 is constructed without use of seams and/or heat seals and/or tape joints, at least because these manufacturing techniques result in potential failure points and/or cold spots in the insulation blanket during flight that are potential locations for condensation and/or frost on the inboard side of a conventional insulation blanket. Because the bay section 306 is formed unitarily as one piece with at least the cap section 308, the insulation blanket 302 can be referred to as a "continuous cap strip insulation blanket".

Figure 5:
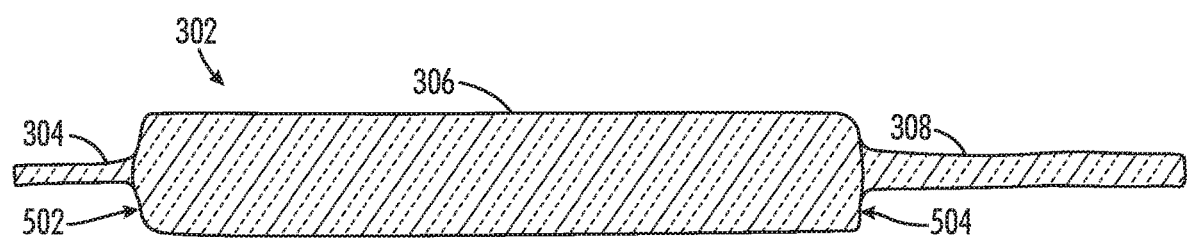
FIG. 5 is a side view of an exemplary insulation blanket of a blanket assembly of FIG. 3.

The return section 304, the bay section 306, and the cap section 308 of the continuous cap strip insulation blanket 302 may vary in width and in depth of insulation as a continuous whole (for example, varying as shown in FIG. 5), but in some aspects, is not less than a depth of insulation sufficient to insulate at least the frame members, such as the frame member 402 (shown in FIG. 4).

As another example, gaps between adjacent insulation blankets 302 are eliminated, or at least reduced, by using an overlapping design from one insulation blanket 302 to the next, optionally in combination with using at least one row of continuous fastener (such as fastener 802, 804, 806, and/or 806 shown in FIGS. 8A and 8B) for the length 406 (shown in FIG. 4) of the insulation blankets 302 where adjacent insulation blankets 302 are fastened together. In some aspects, the fastener is moisture impermeable. Optionally, two or more rows of continuous fastener are used. Optionally the fastener is reversible, for example, a hook and loop fastener is used. Optionally, a bond on index pin fastener is used.

The insulation blanket 302 is optionally used with at least one retaining clip 310 to form the insulation blanket assembly 300. The retaining clip 310 is formed from a resilient material such that the retaining clip 310, when a force is applied to the retaining clip 310, can flex without failing and can return to an original shape when a force is no longer applied to the retaining clip 310. The retaining clip 310 is placed on the inboard side 408 (shown in FIG. 4) of the cap section 308 to resiliently hold at least the cap section 308 to the frame member around which the cap section 308 is wrapped (for example, as shown in FIG. 7). In some aspects, the retaining clip 310 is constructed of a low- or non-thermally conductive material to help eliminate the retaining clip as a source of condensation and frost on an inboard side of the insulation layer 220. The low- or non-thermally conductive material is a resilient material that allows the retaining clip 310 to function as described herein. In an aspect, low thermal conductivity is 50% or more less conductive than conventional metal retaining clips.

From an outboard perspective, looking inboard at the insulation layer 220 (which is constructed of a series of blanket assemblies 300), the insulation layer 220 is a continuous and unified moisture barrier, where the insulation blankets 302 are moisture impermeable, configured for preventing inboard moisture ingress through the insulation layer 220 and also configured for enhancing moisture flow around the outboard side 221 of the insulation layer 220 towards the bilge 260.

FIG. 4 is a perspective, cross-sectional and schematic view of two adjacent insulation blanket assemblies 300a, 300b of FIG. 3 attached together. A first insulation blanket 302a is located within a first bay 410. The first bay 410 is formed between a first frame member 402 and an adjacent frame member 404. A second insulation blanket 302b is located within a second bay 412, adjacent to the first bay 410. As described elsewhere herein, particularly with respect to FIG. 3 and FIG. 7, at least the cap section 308 of each insulation blanket 302 is wrapped around a frame member, for example frame members 402, 404.

More specifically, when two adjacent insulation blankets 302a, 302b are used in combination, the cap section 308a of the first insulation blanket 302a is sized to extend around the frame member 404 and to a bay section 306b of the adjacent second insulation blanket 302b positioned in the second bay 412 of the aircraft 100.

In an aspect, frame members 402, 404 are L-shaped and the cap section 308 has a length commensurate with the frame members' 402, 404 shape and size to enable full wrapping-coverage of the frame members 402, 404 by the cap section 308. It is conceived that the frame members 402, 404 are a shape other than an L-shape, and from aircraft to aircraft, the frame members or the bays can vary in length (as measured around a circumference of the fuselage), width (as measured on an axis extending from nose to tail of the aircraft), and/or shape. The precise dimensions of the sections 304, 306, and/or 308 of the insulation blanket 302 could vary according to the size and shape a respective frame member and/or bay.

FIG. 5 is a side view of the exemplary insulation blanket 302 of the blanket assembly 300 of FIG. 3. The return section 304 is disposed on a first side 502 of the bay section 306 and the cap section 308 is disposed on a second side 504 of the bay section 306, opposite the first side 502. The return section 304, the bay section 306, and the cap section 308 are shown of varying dimensions and thicknesses. For example, the return section 304 is not as thick as the other two sections 306 and 308 because the return section 304 is primarily, but not exclusively, used to connect two insulation blankets together and not necessarily for insulation (because, as shown in more detail in FIG. 7, the cap section 308a of a first blanket 302a will cover entirely the return section 304b of the second blanket 302b). As another example, the cap section 308 is optionally thinner than the bay section 306 because the cap section 308 should be sufficiently pliable to wrap around the frame member 402. As mentioned above, the cap section 308a of the first insulation blanket 302a also covers the return section 304b of the second insulation blanket 302b, enabling the combination of sections 308a, 304b to provide more insulation than just one of the sections alone.

In an aspect, the return section 304 has very little thickness (for example, when it is comprised of coverfilm, described in more detail below with respect to FIG. 8A) up to approximately 0.50 in. (1.27 cm). In an aspect, the bay section 306 has a thickness of approximately 3 in. to 5 in. (7.62 cm to 12.7 cm). In an aspect, the cover section 308 has a thickness of approximately 2 in. (5.08 cm). These dimensions are by way of example only, and can vary depending on the size of frame members, bay sizes, and/or aircraft size, among other considerations.

Figure 6:
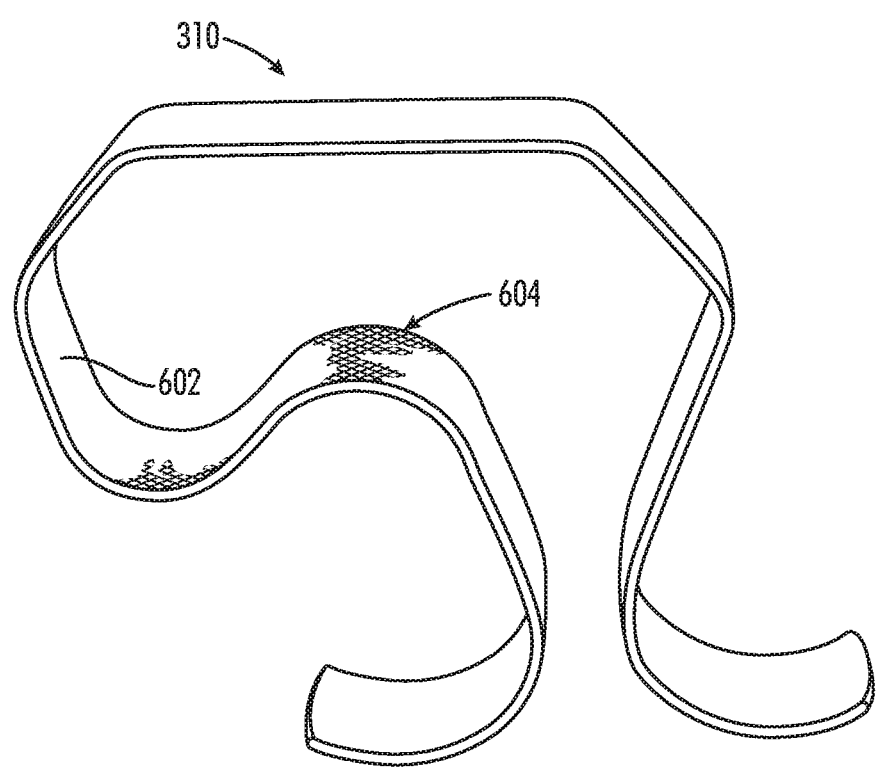
FIG. 6 is a perspective view of an exemplary retaining clip of a blanket assembly of FIG. 3.

FIG. 6 is a perspective view of an exemplary retaining clip 310 of the blanket assembly 300 of FIG. 3. In an aspect, the retaining clip 310 is largely shaped and/or sized as a counterpart to the shape and/or size of the frame member 402 while also factoring in the thickness and/or other dimensions of the insulation blankets 302 that the retaining clip 310 holds to the frame member 402. The retaining clip 310 can be sizes and/or shapes to correspond to differently shaped frame members, insulation blankets of different dimensions, and/or to account for any other aircraft component positioned within the retaining clip 310.

In an aspect, the retaining clip 310 is made of low- or non-thermally conductive material, for example a plastic or a thermoplastic, to avoid having the retaining clip 310 becoming a location of condensation and/or frost on the inboard side 408 of the insulation blanket 302. This is in contrast to conventional retaining clips formed from metal, which can causes thermal conductivity, weight, cost, and compressive force issues. In some aspects, use of the low- or non-thermally conductive material for the retaining clip 310 can manifest synergistic benefits with the enhanced thermal performance, including: using less compression force to facilitate the flow of moisture which gets trapped in the wrinkles/folds of at least the cap section 308 around which the retaining clip 310 is positioned; reducing weight; and reducing cost.

The retaining clip 310 is optionally specially adapted to grip the insulation blanket 302. For example, the retaining clip 310 has a cap section-facing surface 602 that is textured to enhance the grip of the retaining clip 310 on the insulation blanket 302. A partial, textured section 604 is shown on the cap section-facing surface 602. The texturing can comprise some or all of the surface 602. Additionally, alternatively and/or optionally, a gripping material is added to the cap section-facing surface 602. Examples of a "gripping material" are rubber, a non-permanent adhesive, or any suitable material having a relatively high friction coefficient. The textured section 604 can be combined with the low- or non-thermally conductive material. In an aspect, the retaining clip 310 is adapted in such a manner to at least prevent the sliding of the retaining clip 310 along the frame member 402.

FIG. 7 is a cross-sectional, partial view of adjacent, exemplary insulation blankets 302a, 302b, including an exemplary retaining clip 310a. As described elsewhere herein, adjacent insulation blankets 302a, 302b are positioned with respect to each other such that the insulation blankets 302a, 302b overlap at least partially to form a continuous and unified insulation layer 220. As shown in FIG. 7, the cap section 308a of the first blanket 302a is wrapped around the frame member 402 and fastens to the return section 304b and/or the bay section 306b of the second blanket 302b. More details about an exemplary fastener configuration are shown in FIGS. 8A-8B. In an aspect, the retaining clip 310 is placed around at least the cap section 308a of the first insulation blanket 302a to hold the cap section 308a to the frame member 402.

FIG. 8A is a schematic side view showing a fastener configuration on the exemplary insulation blanket 302 of FIG. 3. In an aspect, a return fastener row 802 is affixed to the inboard side 408 of the return section 304, a bay fastener row 804 is affixed to the inboard side 408 of the bay section 306, and/or a first cap fastener row 806 and a second cap fastener row 808 are attached to the outboard side 221 of the cap section 308. In some aspects the fastener rows 802, 804, 806, and/or 808 are reversible in nature, that is, the fasteners comprising the fastener rows 802, 804, 806, 808 can be used for fastening but then can be unfastened, for example in the event of maintenance, repositioning, and/or replacement. In some aspects, hook-and-loop fasteners are used as fasteners comprising the fastener rows 802, 804, 806, and/or 808.

At least one (such as one, some, or all) of the fastener rows 802, 804, 806, 808 are continuous along a length 406 where adjacent blankets are fastened together, in an aspect. Optionally, at least one (such as one, some or all) of the fasteners of the fastener rows 802, 804, 806, 808 are evenly spaced along the length 406. In some aspects, at least one of the fastener rows 802, 804, 806, 808 is supplemented with at least one additional row of fasteners to provide additional fastening and/or redundancy. Accordingly, in this aspect, at least one of, or each of, the bay section 306, the return section 304, and the cap section 308 are provided with at least one row of reversible fasteners 802, 804, 806, and/or 808.

In an aspect where a continuous fastener configuration is used, the return section 304 can be constructed of only a coverfilm (excluding the insulation material), the thin, lightweight material used as a cover of the insulation material of an insulation blanket, to save on weight. In some aspects, the coverfilm is selected from the group consisting of polyetheretherketone (PEEK), polyetherteraphthalate (PET), polyvinylfluoride (PVF), polyetherketoneketone (PEKK), polyimide (PI), and polypropylene (PP).

FIG. 8B shows schematically how the fastener configuration shown in FIG. 8A can be used to reversibly attach adjacent insulation blankets 302a, 302b together. Namely, the cap section 308a of the first insulation blanket 302a can be attached to the return section 304b of the second insulation blanket 302b at fastener rows 806a and 802b. In an aspect, the fastened joint between the cap section 308a and the return section 304b provides additional structural support at the edge of the first insulation blanket 302a. The cap section 308a can also be attached to the bay section 306b of the second insulation blanket 302b using fastener rows 808a and 804b, in an aspect.

Figure 9:
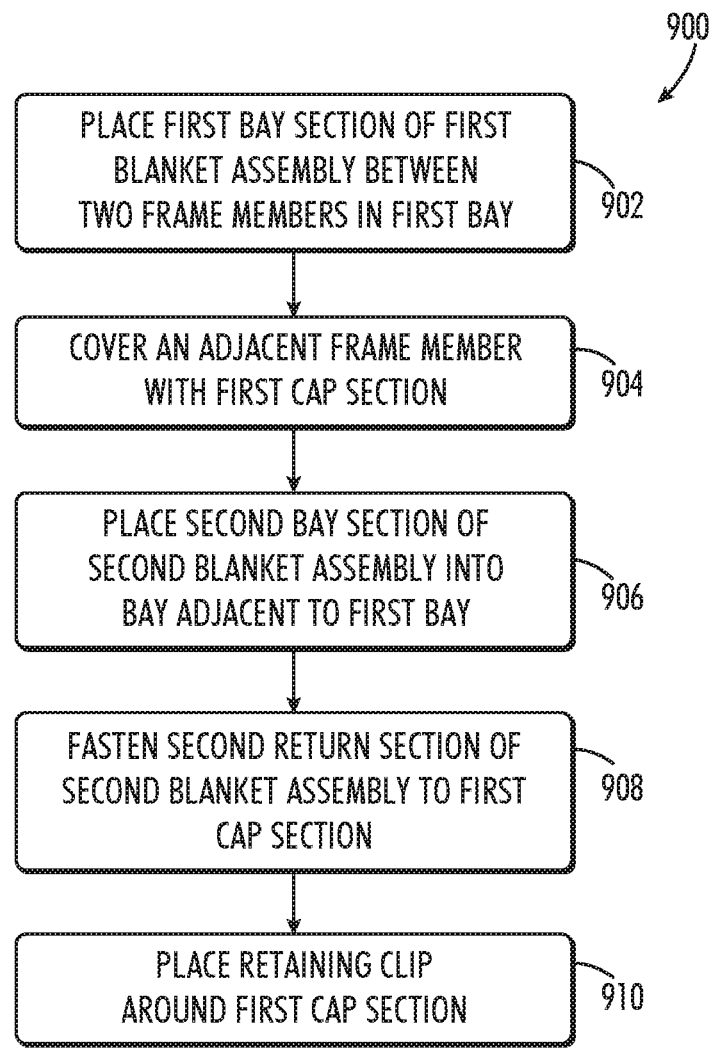
FIG. 9 is a flowchart of a method of using a continuous cap strip insulation blanket assembly of FIG. 3.

FIG. 9 is a flowchart of a method 900 of installing the insulation blanket assembly 300 of FIG. 3. In an aspect, a bay section 306a of a first insulation blanket 302a is placed (902) within a first bay 410. The cap section 308a of the first insulation blanket 302a is wrapped around a frame member 402 adjacent to the first bay 410 to cover (904) the frame member 402 with the cap section 308a. The bay section 306b of a second insulation blanket 302b is placed (906) in a second bay 412 that is adjacent to the first bay 410 and the frame member 402. The second insulation blanket 302b is in the same orientation as the first insulation blanket 302a. The return section 304b of the second insulation blanket 302b is fastened (908) to the cap section 308a of the first insulation blanket 302a. and/or the cap section 308a of the first insulation blanket 302a is fastened to the bay section 306b of the second insulation blanket 302b. Optionally, at least one retaining clip 310 is placed (910) around the first cap section 308a of the first insulation blanket 302a to hold the cap section 308a to the frame member 402.

The method 900 actions (902), (904), (906), (908) and (910) are repeated, as necessary, for as many additional insulation blanket assemblies 300 as are desired to form a unified and continuous insulation layer 220 in the aircraft 100.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate aspects, may also be provided in combination in a single aspect. Conversely, various features of the disclosure, which are, for brevity, described in the context of a single aspect, may also be provided separately or in any suitable subcombination or as suitable in any other described aspect of the disclosure. Certain features described in the context of various aspects are not to be considered essential features of those aspects, unless the aspect is inoperative without those elements.

Although the disclosure has been described in conjunction with specific aspects thereof, it is evident that many alternatives, modifications and variations will be apparent to those skilled in the art. Accordingly, it is intended to embrace all such alternatives, modifications and variations that fall within the spirit and broad scope of the appended claims.

Citation or identification of any reference in this application shall not be construed as an admission that such reference is available as prior art to the present disclosure. To the extent that section headings are used, they should not be construed as necessarily limiting.

What is claimed is:

1. A blanket assembly for use in at least one bay and with at least one frame member of an aircraft, the blanket assembly comprising:
   an insulation blanket, the insulation blanket comprising,
      a bay section sized and shaped to fit within the bay and of sufficient thickness to provide thermal insulation to the bay;
      a return section disposed on a first side of the bay section; and
      a cap section disposed on a second side of the bay section, opposite the first side, the cap section sized and shaped to at least partially cover the frame member when the cap section is wrapped around the frame member, the cap section being of sufficient thickness to provide thermal insulation to the frame member,
      wherein the bay section, the return section, and the cap section are of unitary construction;
      wherein each of the bay section, return section and cap section are provided with at least one row of reversible fasteners.

2. A blanket assembly according to claim 1, wherein the bay section, the return section, and the cap section vary in thickness as a continuous whole, without the use of seams or heat seals or tape joints.

3. A blanket assembly according to claim 1, wherein the at least one row of reversible fasteners is affixed near the first side of the bay section on an inboard side of the bay section.

4. A blanket assembly according to claim 1, wherein the at least one row of reversible fasteners is affixed on an inboard side of the return section.

5. A blanket assembly according to claim 1, wherein at least two rows of reversible fasteners are affixed on an outboard side of the cap section.

6. A blanket assembly according to claim 1, wherein the cap section of the insulation blanket is sized to extend around the frame member and to a bay section of an adjacent second insulation blanket positioned in an adjacent second bay of the aircraft.

7. A blanket assembly according to claim 6, wherein the at least one row of reversible fasteners on the bay section is configured as a counterpart to a second cap fastener row, and the at least one row of reversible fasteners on the return section is configured as a counterpart to a first cap fastener row.

8. A blanket assembly according to claim 1, wherein the at least one row of reversible fasteners is comprised of hook and loop fasteners.

9. A blanket assembly according to claim 1, wherein the at least one row of reversible fasteners is evenly spaced along a length of the insulation blanket.

10. A blanket assembly according to claim 1, wherein the at least one row of reversible fasteners is continuous along a length of the insulation blanket.

11. A blanket assembly according to claim 10, wherein the return section comprises only a coverfilm material.

12. A blanket assembly according to claim 1, further comprising a retaining clip placed around the cap section, the retaining clip holding the cap section to the frame member, the retaining clip being formed from a resilient material.

13. A blanket assembly according to claim 12, wherein the retaining clip is constructed of a low-thermally conductive material.

14. A blanket assembly according to claim 12, wherein a cap section-facing portion of the retaining clip is textured to enhance the grip of the retaining clip on the insulation blanket.

15. A blanket assembly according to claim 1, wherein the insulation blanket is moisture impermeable.

16. An insulation layer of an aircraft, the insulation layer comprising:
   a plurality of insulation blanket assemblies of claim 1, wherein the insulation blanket assemblies are reversibly fastened together.

17. A method of using at least one insulation blanket assembly with at least one bay and at least one frame member of an aircraft, the method comprising:
   placing a first insulation blanket within a first bay, the first insulation blanket comprising at least one row of fasteners on each of a bay section, a return section, and a cap section;
   covering the at least one frame member with the cap section of the first insulation blanket;
   placing a second insulation blanket in a second bay adjacent to the first bay and the at least one frame member, the second insulation blanket comprising at least one row of fasteners on each of a bay section, a return section, and a cap section; and
   removably fastening the at least one row of reversible fasteners on the cap section of the first insulation blanket to the at least one row of corresponding reversible fasteners on at least one of the return section and the bay section of the second insulation blanket.

18. A method according to claim 17, further comprising placing at least one retaining clip around the cap section of the first insulation blanket to hold the cap section to the at least one frame member.

19. A method according to claim 18, further comprising repeating placing an insulation blanket, covering the frame member with the cap section, placing an additional insulation blanket, fastening the cap section and placing the retaining clip around the cap section, for as many additional insulation blanket assemblies as desired to form an insulation layer of the aircraft.

20. A blanket assembly for use in at least one bay and with at least one frame member of an aircraft, the blanket assembly comprising:

an insulation blanket, the insulation blanket comprising, a bay section sized and shaped to fit within the bay and of sufficient thickness to provide thermal insulation to the bay;

a return section disposed on a first side of the bay section; and a cap section disposed on a second side of the bay section, opposite the first side, the cap section sized and shaped to at least partially cover the frame member when the cap section is wrapped around the frame member, the cap section being of sufficient thickness to provide thermal insulation to the frame member;

wherein the bay section includes a greater thickness than the return section and the cap section;

wherein the return section is thinner than the bay section and the return section is thinner than the cap section, the cap section comprises a coverfilm material and an insulation material;

fasteners positioned along each of the bay section, the return section, and the cap section, and with the fasteners not extending through the insulation blanket.

* * * * *